Aug. 31, 1965 P. BEST 3,203,084

BONDING OF METALS TO CERAMIC MATERIALS

Filed Sept. 25, 1961

Inventor
PETER BEST
By Philip M. Bolton
Attorney

United States Patent Office 3,203,084
Patented Aug. 31, 1965

3,203,084

BONDING OF METALS TO CERAMIC MATERIALS

Peter Best, London, England, assignor to International Standard Electric Corporation, New York, N.Y., a corporation of Delaware Filed Sept. 25, 1961, Ser. No. 159,472
Claims priority, application Great Britain, Oct. 12, 1960, 34,934/60
5 Claims. (Cl. 29—473.1)

The invention relates to the bonding of metals to ceramics.

In one known process for bonding a metal member to a ceramic member the surface of the ceramic to be joined to the metal is first metallized and then the metal member is brazed to the metallized surface in a separate operation. In another one-step process, an active alloy containing, for example, titanium as the active ingredient, is applied between metal and ceramic members to be joined and the assemblage is heated in vacuo; the titanium bonds to the ceramic and the other alloy constituents serve as a braze between the metal member and the titanium. So far as we are aware such a one-step process has not hitherto been successfully applied except under conditions of high vacuum.

The present invention consists in a method of bonding a metal member to a ceramic member comprising the steps of applying a suspension of a mixture of molybdenum oxide or tungsten oxide with a metallic additive in an organic binder to the ceramic surface to be bonded, placing the metal member in juxtaposition to the coating with a brazing metal in between, and firing the assemblage in hydrogen to reduce the oxide to metal, the metallic additive being such as to increase the wettability of metallic molybdenum or tungsten, respectively, by the brazing metal.

The invention will be described by way of example with reference to the accompanying drawings in which.

Figure 1:
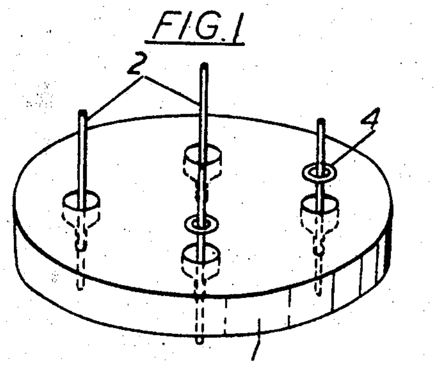
FIG. 1 is a perspective sketch illustrating a ceramic insulator with metal pins passed therethrough preparatory to bonding the pins to the insulator.

The ceramic insulator 1 of FIG. 1 may be an alumina-based ceramic of $Al_2O_3$ content lying between 60%–100%, for example, forsterite, steatite, an alumina-silica body or pure alumina.

Figure 2:
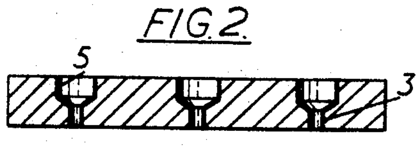
FIG. 2 is a cross-section through the insulator of FIG. 1.
Figure 3:
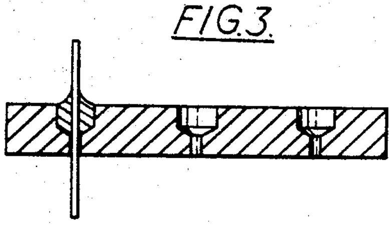
FIG. 3 is a cross-section through the insulator after a metal pin has been secured therein.

The pins 2 are of a metal or alloy whose thermal expansion coefficient is compatible with that of the ceramic such as one of the commercial nickel-iron or nickel-cobalt iron alloys, or molybdenum. The insulator is prepared with holes for reception of the pins 2 as shown in FIG. 2. The inside surfaces of these holes are then coated by any convenient method, as indicated at 3, with a suspension of a molybdenum or tungsten oxide admixed with a further metallic additive such as iron, cobalt, nickel, copper or a compound thereof which may also be an oxide, whose purpose is to increase the wettability of metallic molybdenum or tungsten, respectively, with regard to the brazing metal. The pins 2 are inserted through the holes in the insulator 1 and held in position by means of a furnace jig, not shown. A ring 4 of brazing metal is placed over each pin so as to sit loosely in the enlarged portion of the surrounding aperture. The assemblage is then inserted into a hydrogen furnace. The spacings between the aperture sides and the brazing ring 4 and pins 2 must be such as to allow free access of hydrogen to the metallizing coating so as to reduce this to the metallic state. The molybdenum or tungsten, as the case may be, forms a bond with the ceramic material and the metal of the brazing ring 4 flows over the molybdenum or tungsten surface and, on eventual cooling, bonds the pins 2 to the metallizing and to the ceramic, as illustrated in FIG. 3.

Although a particular form of insulator and metal members has been described above, the invention is not limited thereto: for example the invention can also be used to butt-join a metal cylinder to a ceramic disc.

The following are examples of methods used in carrying out the invention:

*Example I*

The ceramic insulator 1 is a high purity alumina body of $Al_2O_3$ content not less than 98 percent. The brazing ring 4 may be of any conventional metal or alloy whose melting point exceeds 700° C.; preferably the melting point should be as high as possible, and for the present example, where a high degree of vacuum tightness is required, pure copper is the preferred material. The metallizing mixture is made up according to the following formula:

| | |
|---|---|
| Molybdenum trioxide | 48.5 grams. |
| Nickel oxide | 1.5 grams. |
| Nitrocellulose solution | 25. grams. |
| Amylacetate thinner | Approx. 25 ccs. |

The nitrocellulose solution consists of 2.5 percent nitrocellulose in ethyl carbonate. The constituents are all ball milled together to ensure adequate mixing and homogenising, the amylacetate thinner content being adjusted to give adequate consistency for the method of application preferred, i.e. brushing, spraying, etc.

In the present application it is found that drain-coating is a satisfactory method of application; the mixture is applied to each hole from a small dropper and excess suspension is blown out. After air drying, the insulator pins and the copper braze rings are placed together on a jig, as described above, and the assemblage is introduced into a hydrogen furnace in which it is subjected to the following schedule:

Initial heating to 1200° C.
Assemblage kept at 1200° C. for 3 to 5 minutes.
Assemblage cooled to room temperature.

The initial heating period is protracted between 600 and 1200° C. to allow sufficient diffusion time for adequate reduction of the metallic oxides to occur. In this example fifteen minutes is allowed, due regard being paid to the thermal shock properties of the ceramic body.

The resulting assembly is vacuum tight, and is suitable for use in thermionic vacuum tubes.

*Example II*

The metallizing mixture contains:

| | Grams |
|---|---|
| $MoO_3$ | 97.0 |
| NiO | 3.0 |
| Binder solution | 25.0 |

The binder solution is a 20 percent by weight solution of methyl methacrylate in xylene. Xylene is then added to the mixture to bring it to the required consistency for painting, spraying or the like.

The braze material in this example is a copper/silver eutectic alloy containing 71 percent silver, 29 percent copper. The metallizing mixture is applied as described above and the assemblage of ceramic insulator and metal pins with surrounding rings of brazing material is placed in a jig in the hydrogen furnace as previously described. The following heating schedule is used:

Initial heating to 800° C.
Assemblage kept at 800° C. for 3 minutes.
Assemblage cooled to room temperature.

It is to be understood that the foregoing description of specific examples of this invention is not to be considered as a limitation on its scope.

What I claim is:

1. A method of bonding a metal member to a ceramic member comprising the steps of forming a suspension of a mixture of a metallic oxide selected from the group consisting of molybdenum oxide and tungsten oxide with a further metallic oxide of a metal selected from the group consisting of iron, cobalt, nickel and copper in an organic binder, applying the suspension to form a coating on the ceramic surface to be bonded, placing the metal member in juxtaposition to the coating with a brazing metal in between, said brazing metal being selected from the group consisting of copper, copper-nickel, copper-silver, copper-gold and copper-silver-palladium, and firing the assemblage in a predetermined heating schedule in a hydrogen atmosphere to reduce the oxide to metal and join the metal and ceramic members, the further metallic oxide being such as to increase the wettability of the reduced metal by the brazing metal.

2. A method as claimed in claim 1 in which the further metallic oxide is nickel oxide.

3. A method as claimed in claim 2 in which the suspension comprises molybdenum trioxide mixed with a proportion of nickel oxide lying between ½% to 4% by weight of the dry mixture.

4. A method as claimed in claim 1 wherein the assemblage is initially heated for a protracted period from a temperature below the melting point of the brazing metal to a predetermined temperature above the melting point, maintained at the predetermined temperature for 3 to 5 minutes, and then cooled to room temperature.

5. A method as claimed in claim 1 wherein the brazing metal is spaced between the metal member and ceramic surface to allow free access of hydrogen to the coating.

References Cited by the Examiner

UNITED STATES PATENTS

| | | | |
|---|---|---|---|
| 2,282,106 | 5/42 | Underwood | 29—473.1 X |
| 2,667,427 | 1/54 | Nolte | 29—492 X |
| 2,680,824 | 6/54 | Beggs | 29—155.5 |
| 2,835,967 | 5/58 | Umblia | 29—473.1 X |
| 3,063,144 | 3/62 | Palmour | 29—492 X |

FOREIGN PATENTS

| | | |
|---|---|---|
| 776,970 | 6/57 | Great Britain. |

JOHN F. CAMPBELL, *Primary Examiner.*